Jan. 9, 1962 A. HAMBURGEN 3,016,195

BINARY MULTIPLIER

Filed Dec. 30, 1954 2 Sheets-Sheet 1

INVENTOR.
ARTHUR HAMBURGEN
BY [signature]
ATTORNEY

Jan. 9, 1962 A. HAMBURGEN 3,016,195

BINARY MULTIPLIER

Filed Dec. 30, 1954 2 Sheets-Sheet 2

INVENTOR.
ARTHUR HAMBURGEN

BY [signature]

ATTORNEY

United States Patent Office 3,016,195
Patented Jan. 9, 1962

3,016,195
BINARY MULTIPLIER
Arthur Hamburgen, Endicott, N.Y., assignor to International Business Machines Corporation, New York, N.Y., a corporation of New York
Filed Dec. 30, 1954, Ser. No. 478,595
12 Claims. (Cl. 235—164)

Figure 1:
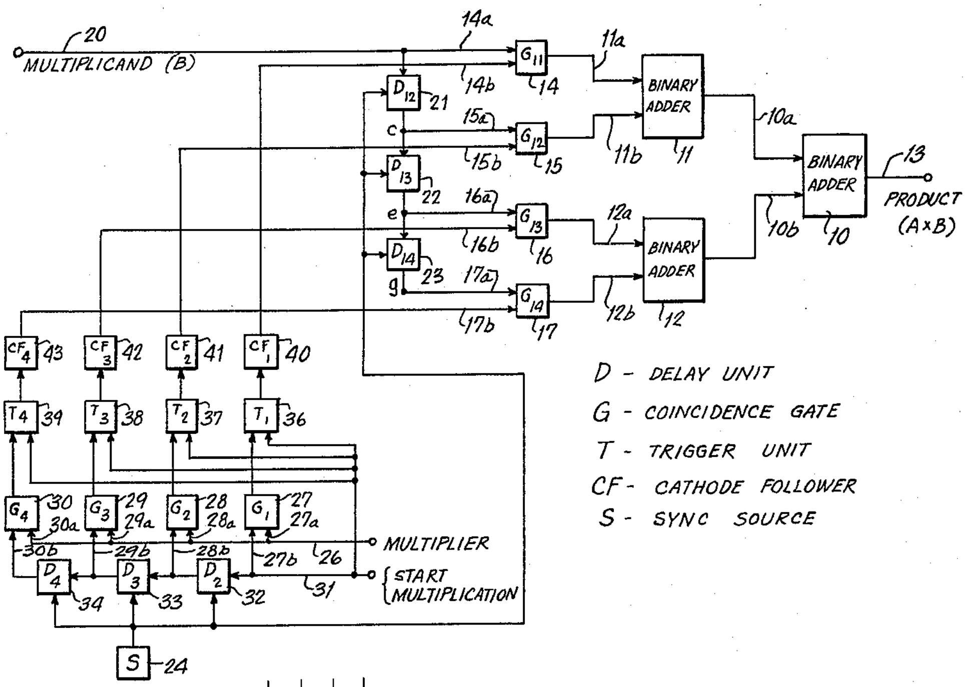

The present invention relates to an electrical binary multiplier system for performing the process of multiplication between two numbers each in binary-digital form in series mode, this mode being such that the digits in each number are each represented by an electrical signal occurring in its allotted instant of time.

The binary or base two system uses just two symbols (0 and 1) to represent all quantities instead of ten symbols as in the decimal system. Counting is started in the binary system in the same way as in the decimal system with 0 for zero and 1 for one. But at two in the binary system it is found that there are no more symbols. It is necessary to take the same move at two in the binary system that is taken at ten in the decimal system. This move is to place a 1 in the first position to the left and start again with a 0 in the original position. Therefore, 10 in the binary system is the equivalent of 2 in the decimal system. Counting is continued in an analogous manner with a carry to the next higher order every time a two is reached instead of every time a ten is reached.

The binary system is particularly suited for use in mechanical and electrical calculators since nearly all present calculator components are inherently binary. For example, a hole is either present or absent in a given location in a card used to record statistical or the like data, or an electromagnetic relay maintains its contacts either closed or open, or a vacuum tube or rectifier device is conveniently maintained either fully conducting or nonconducting. Calculation is performed by proper manipulation of the binary digits and in general can be reduced to the four functions of adding, subtracting, multiplying and dividing.

Binary multiplication may be done by examination of the multiplier digits one at a time, the multiplicand being added with appropriate column shift each time a 1 appears in the multiplier and nothing being done when a 0 appears in the multiplier. It has been proposed that binary multiplication be accomplished by a process which first explores the multiplier in its entirety and conditions a plurality of translating paths either to translate or not in dependence upon the presence or absence of a 1 in each digital position of the multiplier. These translating paths are thereafter employed to translate the multiplicand to individual ones of a plurality of binary adders arranged in tandem and with a digital-period delay between successive adders in the order of their tandem arrangement. This arrangement has the important disadvantage that its rapidity of operation is inherently limited by the fact that a first time interval is required to explore the largest multiplier which may be processed by the system and a second interval of time is then required for the actual multiplication process. This fact, of course, places a severe restriction on the rapidity of system operation, particularly where binary numbers of large magnitude are to be processed by the system. There is the further important disadvantage with this arrangement that time delays which may be inherent in each adder become cumulative from adder to adder in their tandem arrangement and this fact establishes a finite limit on the shortest digit period which may be used without error in the multiplication process.

It is an object of the present invention to provide a new and improved electrical binary multiplier system which requires only a minimum of time for processing two binary numbers each in serial form presented to it simultaneously.

It is a further object of the invention to provide a novel electrical binary multiplier system in which the multiplication process is simultaneously performed on two binary numbers each presented in serial form, and a binary product is immediately available simultaneously with the presentation of the two numbers.

It is an additional object of the invention to provide a novel electrical binary multiplier system in which the product of a multiplication process emerges instantaneously in serial form, the lowest order of the product emerging at the same bit time as the lowest order of the multiplicand and multiplier is presented to the system and higher orders of the product emerging concurrently with corresponding higher order bit times of the multiplicand and multiplier.

In accordance with the invention, an electrical binary multiplier embodying the invention includes a binary adder for totalizing a plurality of binary numbers individually applied to multiple input channels thereof, the channels being arranged in a given order and each having a controllable translation characteristic. There is included means for applying a binary multiplicand in serial form successively to each of the input channels in order but with a digit-period delay as between successive channels, and means responsive to each of successive digits in a binary multiplier in serial form for controlling in order the translation characteristic of individual ones of the channels to effect controlled successive translation of the multiplicand to the several input channels of the adder.

Figure 2:
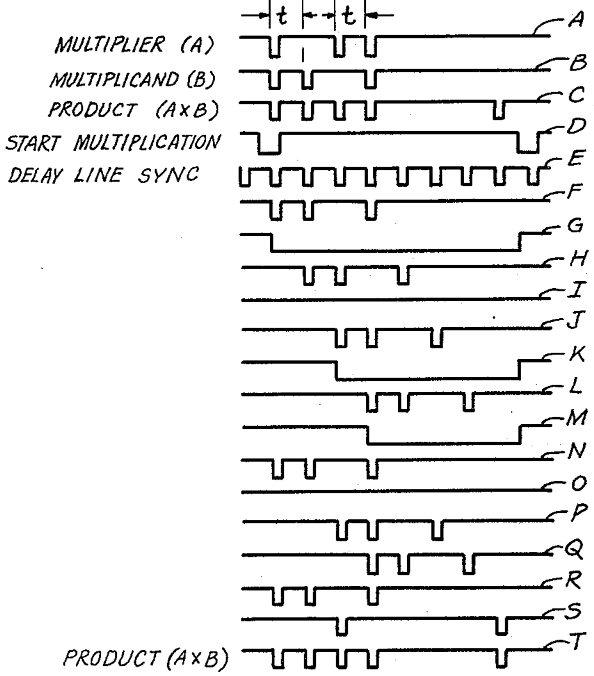
Figure 3:
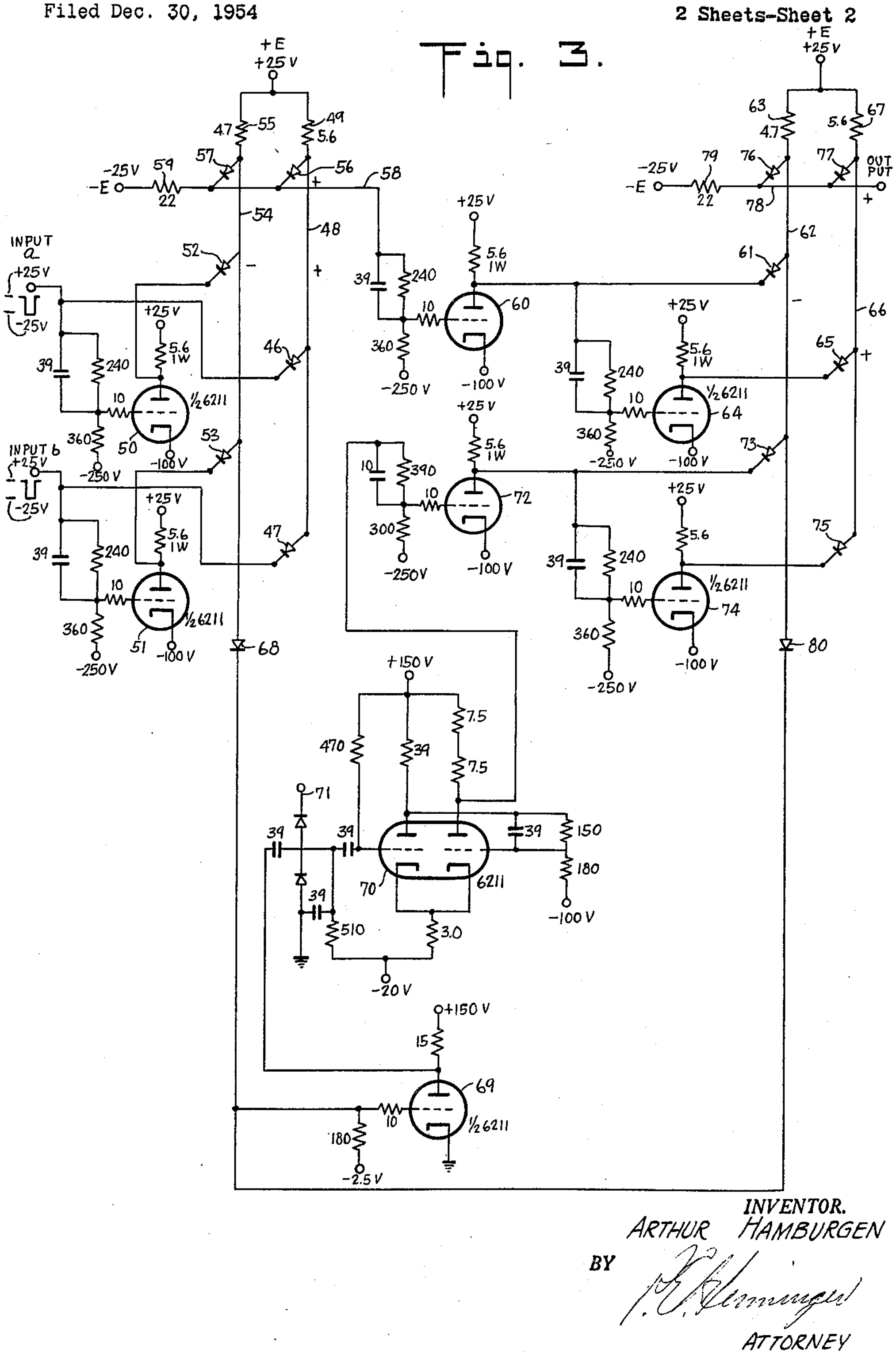

Other objects and advantages of the invention will appear as the detailed description thereof proceeds in the light of the drawings forming a part of this application, and in which:

FIG. 1 is a schematic diagram representing an electrical binary multiplier embodying the present invention in a particular form;

FIG. 2 graphically represents a typical binary multiplication which may be accomplished by the FIG. 1 multiplier and is used as an aid in explaining the operation of the latter; and FIG. 3 is a circuit diagram, partially schematic, representing the arrangement of an individaul binary adder unit suitable for use in the FIG. 1 arrangement.

Referring now more particularly to FIG. 1, the multiplier includes a binary adder which for convenience is shown as including three individual adder units 10, 11 and 12. The unit 10 provides the binary adder totalized output circuit 13, and each adder unit includes two input input circuits identified as "*a*" and "*b*" to which are applied individual binary numbers to be added by the unit. The individual adder units 11 and 12 thus provide a plurality of input channels **11*a*, 11*b*, 12*a* and 12*b* which are respectively coupled to the output circuits of coincidence gates 14, 15, 16 and 17 by which to provide a controllable translation characteristic for each input channel. This type of adder may be considered one having plural adder units arranged in parellel-cascade as a converging series to provide plural input channels 14*a*, 15*a*, 16*a* and 17*a* (corresponding in number to a predetermined maximum number of digits of a multiplicand and having a controllable translation characteristic by virtue of the respective gates 14, 15, 16 and 17) and to provide a single output circuit 13 in which a resultant output sum binary digit is developed concurrently with the application and translation of binary digits at any of the plural input channels, each such output digit constituting one digit of a binary number in serial form equal to the sum of all binary numbers applied to the plural input channels. In this, the binary adder units 11** and 12 are in parallel arrangement, and the binary adder unit 10 is in cascade arrangement with each of units 11 and 12 so that the successive or series arrangement of units converges to a single output circuit 13. The coincidence gate units are conventional and are of a type having two input circuits, identified as "*a*" and "*b*" circuits, to the "*a*" circuit of which a signal is applied for translation by the unit but such signal is not translated until a control signal of given magnitude and polarity is applied to the "*b*" circuit thereof. A coincidence gate of this nature may conveniently take the form of a pair of rectifier devices individual to the "*a*" and "*b*" circuits and having cathode electrodes connected both through a resistor to a negative potential source and to an output circuit of the gate unit. The anode electrodes of the rectifiers are individually biased with the same value of positive potential. While a negative-going signal pulse may be applied to one rectifier to render it non-conductive, the signal pulse does not appear in the output circuit of the gate since the other rectifier remains conductive. Thus negative-going signal pulses applied to both rectifiers at the same time are translated to the output circuit of the gate unit since the pulses render both rectifiers non-conductive together and this permits the output circuit to assume the potential of the negative potential source.

It will be understood that the binary adder arrangement thus far described is one which for simplicity has been shown as suitable for adding binary numbers having a maximum of four digits, but may be enlarged by duplication in well known manner to handle binary number having a larger number of digits.

A digit multiplicand input circuit 20 is coupled directly to the input circuit 14*a* of the gate unit 14 and is coupled through successive delay units 21, 22 and 23 to the respective input circuits 15*a*, 16*a* and 17*a* of the remaining coincidence gate units. The delay units 21, 22 and 23, as well as other delay units hereinafter mentioned, each provide a delay equal to the digit period (from the leading edge of one to the leading edge of the next succeeding binary pulse) of the binary numbers applied to the multiplier and may each be of the type disclosed in the Genung L. Clapper application Serial No. 346,938, filed April 6, 1953, now Patent No. 2,801,334, entitled Dynamic Storage Circuit, and assigned to the same assignee as the present application. This form of delay unit is controlled in operation by a synchronizing signal of negative-going pulse wave form applied to an input circuit of the unit from a synchronizing signal generator 24 having a repetition period (from the leading edge of one synchronizing pulse to the leading edge of the next) equal to the digit period (from the leading edge of one binary pulse to the leading edge of the next adjacent succeeding binary pulse such as shown by the time *t* in FIG. 2) of the binary numbers applied to the multiplier system.

The multiplier includes a binary multiplier input circuit 26 which is coupled to an input circuit 27*a* of a coincidence gate 27 and also to similar input circuits of coincidence gates 28, 29 and 30. Also included is a start-multiplication control circuit 31 to which a negative-going pulse is applied at the initiation of the multiplication process. The control circuit 31 is coupled directly to an input control circuit 27*b* of the gate 27 and through successive delay units 32, 33 and 34 to individual ones of the input control circuits 28*b*, 29*b* and 30*b* of the respective gates 28, 29 and 30. Also applied to a synchronizing signal input circuit of the delay units 32, 33 and 34 is the synchronizing signal of the source 24. As previously mentioned, the delay units 32, 33 and 34 each provide a delay equal to the digit period of the binary numbers applied to the multiplier.. The output circuits of the gate units 27–30 are coupled to individual ones of the input circuits of a plurality of trigger units 36–39 each of which may be a conventional bi-stable form of multivibrator responsive to a negative-going input pulse signal for generating in its output circuit a negative-going pulse signal having a leading edge coincident with that of the input pulse but having a duration extending to the leading edge of the succeeding start-multiplication pulse. For this purpose, the start-multiplication circuit 31 is coupled to a control circuit of each of the trigger units 36–39 and the start-multiplication pulse is effective to restore each unit from its condition existing at the end of a multiplication process to an initial condition in which the unit is in readiness for a new multiplication operation. The leading edge of the start-multiplication pulse precedes the lowest digit position of the multiplier by an interval sufficient to effect such restoration of the units 36–39 prior to the start of the new multiplication process.

The output signals of the trigger units 36–39 are coupled through a respective cathode follower 40–43 of conventional form to the respective input circuits 14*b*–17*b* of the gates 14–17.

In the multiplier arrangement just described, the several coincidence gates 14–17 and delay units 21–23 may be considered as together constituting a multiplicand column shift unit, whereas the units 27–30, 32–34, and 36–39 together may be considered as together constituting a multiplier distributor unit. The cathode follower amplifiers 40–43 are used principally as low impedance driving sources by which to translate the output control pulses of the units 36–39 to the gates 14–17.

Considering now the operation of the multiplier above described, and referring to the curves of FIG. 2, curve A represents by way of illustration a multiplier binary number of the form 1101 which in binary form corresponds to the numeral 13 and is applied to the multiplier input circuit 26. Curve B represents by way of illustration a multiplicand binary number of the form 1011 which corresponds to the number 11 and is applied to the multiplicand input circuit 20. The binary product is represented by curve C which corresponds to the number 143. The start-multiplication pulses are represented by curve D, and the synchronization signal of the unit 24 is represented by curve E. The multiplicand is applied by circuit 20 directly to the input circuit 14*a* of the coincident gate 14, as represented by curve F. The leading edge of the start-multiplication pulse precedes, as earlier mentioned, the lowest order digit position of the multiplier and is effective to restore each of the trigger units 36–39 from their existing condition at the end of a preceding multiplication process to their initial condition in readiness for initiation of the present multiplication.

The start-multiplication pulse is also applied to the coincidence gate 27 so that the first or lowest order digit of the multiplier is translated by unit 27 to the trigger unit 36 to change the restored state of the latter until again restored by the next succeeding start-multiplication pulse. The trigger unit 36 thus develops an output pulse represented by curve G and applies this pulse to the control circuit 14*b* of the gate 14 to permit translation by unit 14 of the multiplicand. The start-multiplication pulse is also translated through the delay unit 32 and is applied to the coincidence gate 28 one digit period later than it was applied to the gate 27. Since in the illustrative example chosen the multiplier does not have a 1 digit at the second digit period, no pulse is accordingly translated to the trigger unit 37 and no output control pulse is applied by this unit to the coincidence gate circuit 15*b*, as represented by curve I. In similar fashion, start-multiplication pulses after one and two digit-period delays in the units 33 and 34 are applied to the respective gates 29 and 30. Since the multiplier has unit digits in the third and fourth digit positions, the trigger units 38 and 39 develop control pulses and apply them to the respective coincidence gate control circuits 16*b* and 17*b*, as represented by respective curves K and M.

The multiplicand experiences a digit-period delay in unit 21, and is thereafter applied to the input circuit 15*a* of the gate 15 as represented by curve H. The multiplicand further experiences a similar delay in the unit 22 before application to the input circuit 16*a* of the gate 16, as represented by curve J, and a third delay in unit 23 before application to the gate 17 as represented by curve L.

The control pulse applied to the input circuit 14*b* of the gate 14 permits the latter to translate the multiplicand to the adder 11, as represented by curve N. No multiplicand is applied to the adder input circuit 11*b*, as represented by curve O, since no control potential was applied to the control circuit 15*b* of the gate 15. The control signals applied to the control circuits 16*b* and 17*b* of the respective gates 16 and 17 permit these units to translate the multiplicand. There is accordingly applied to the input circuit 12*a* of the adder 12 a multiplicand, represented by curve P, having a two-digit-period delay and there is also applied to the input circuit 12*b* of the adder 12 a multiplicand, represented by curve Q, having a three-digit-period delay. The adder 11 applies to the input circuit 10*a* of the adder 10 the single multiplicand signal which was applied to unit 11, and thus one represented by curve R, whereas the adder 12 applies to the input circuit 10*b* of the adder 10 the sum of the two multiplicand binary numbers applied to its input circuits (curves P and Q) and thus applies a totalized binary number represented by curve S. The adder 10 totalizes the binary numbers applied to its input circuits 10*a* and 10*b*, and accordingly develops in its output circuit 13 a binary number in serial form and represented by curve T which is the product of the multiplicand and multiplier.

In the foregoing described operation, it will be noted that each multiplicand traverses the same number of adders to the output circuit 13 as does any other multiplicand. This has the important advantage that any delay which may be inherent in the adder units delays each multiplicand uniformally with the result that the accuracy of the multiplication process is not adversely affected by such adder delays nor is the shortness of the binary period (i.e., the interval between binary digits) limited by such delays since corresponding additive digits maintain precise time relationships throughout all of the units 10, 11 and 12. This, of course, is an advantage in enabling more rapid multiplication by shortening the binary inter-digit interval used in setting up the binary numbers in serial form.

FIG. 3 is a circuit diagram of an individual binary adder suitable for use as any of the individual adders 10, 11 or 12 of the FIG. 1 multiplier arrangement.

The input circuits *a* and *b* are each coupled through respective rectifier devices 46 and 47 to a conductor 48 which is connected through a resistor 49 to a source of positive potential +E. The input circuits are also connected to the input electrodes of conventional inverter stages 50 and 51, having output circuits coupled through respective rectifier devices 52 and 53 to a conductor 54 which is connected through a resistor 55 to the potential source +E. The conductors 48 and 54 are also connected through respective rectifier devices 56 and 57 to a conductor 58, which in turn is coupled through a resister 59 to a negative source of potential −E.

The conductor 58 is connected to the input electrode of an inverter stage 60, having an output circuit coupled through a rectifier device 61 to a conductor 62 which is connected through a resistor 63 to the potential source +E. The output circuit of the stage 60 is also coupled to the input electrode of an inverter stage 64, and the output circuit of the latter is connected through a rectifier device 65 to a conductor 66 which is connected through a resistor 67 to the potential source +E.

The conductor 54 is connected through a rectifier device 68 to an input electrode of an amplifier 69, while the conductor 62 is similarly connected through a rectifier device 80 to the input electrode of the amplifier 69. The output circuit of the amplifier 69 is coupled to a delay line unit 70, which may be of the Clapper type above mentioned, having an input circuit 71 to which synchronizing pulses from the source 24 of FIG. 1 are applied. The output circuit of the delay unit 70 is coupled to an inverter stage 72, having an output circuit coupled through a rectifier device 73 to the conductor 62 and to an input electrode of an inverter stage 74. The output circuit of the latter is coupled through a rectifier device 75 to the conductor 66.

The conductors 62 and 66 are coupled through respective rectifier devices 76 and 77 to a conductor 78 which provides the output circuit to the adder and is also connected through a resistor 79 to the negative potential source −E. Representative component values and tube types suitable for the adder are indicated in the drawing, resistance values being in thousands of ohms and capacitance values being in micromicrofarads.

Considering now the operation of the adder described, it will be initially assumed that no negative-going input pulses appear at the input circuits *a* and *b*. Under this assumed condition, each of the input circuits is at a potential of +25 volts and the rectifier devices 46 and 47 are accordingly non-conductive. The inverter stages 50 and 51 are conductive with the result that both of the rectifier devices 52 and 53 are conductive since the anode potentials of the stages 50 and 51 are negative with respect to ground potential. The conductor 54 is accordingly at a negative potential of such value that the rectifier device 57 may be considered as non conductive. However, the rectifier device 56 is conductive, passing current between the sources +E and −E through the resistors 49 and 59 which act as a resistive voltage divider to make the conductor 58 at a positive potential above ground. It can similarly be shown that under the assumed conditions the inverter stages 60 and 72 through their associated rectifier devices 61 and 73 maintain the conductor 62 at a negative potential, whereas the inverter stages 64 and 74 with their associated rectifier devices 65 and 75 permit the conductor 66 to be at a positive potential. The rectifier device 76 may be considered non-conductive under these conditions and the rectifier device 77 maintains output circuit conductor 78 at a positive potential by current flow between the potential sources +E and −E through the voltage divider resistors 67 and 79.

Assume now that a negative-going input pulse is applied to the input circuit *a*. The pulse renders the rectifier device 46 conductive and through phase inverter 50 renders the rectifier device 52 non-conductive. The negative potential condition of the conductor 54 is not changed, however, since the rectifier device 53 remains conductive, and the rectifier 57 remains non-conductive. Change of the state of condition of the rectifier device 46, on the other hand, makes the conductor 48 negative and the rectifier 56 thereupon becomes non-conductive so that the conductor 58 is permitted to assume the potential of the source −E. A negative pulse is thus applied to the inverter 60 which renders its associated rectifier 61 non-conductive and through the inverter 64 renders the rectifier 65 conductive. The negative potential of the conductor 62 is not changed when the rectifier 61 becomes non-conductive since the rectifier 73 remains conductive, but the change of conductivity of the rectifier device 65 makes the conductor 66 negative and this makes the rectifier device 77 non-conductive and permits the output circuit 78 to assume the negative potential of the source −E. Thus a negative-going input pulse at the input circuit *a* is translated through the adder as a negative-going output pulse at the output circuit 78.

It can be shown by like analysis that a negative-going input pulse at the input circuit *b* similarly is translated through stages 60 and 64 as a negative-going pulse at the output circuit conductor 78.

If now, however, it be assumed that negative-going pulses are simultaneously applied to input circuits *a* and *b*, both of the rectifier devices 46 and 47 are rendered conductive and the conductor 48 is thereby made negative. At the same time, the inverters 50 and 51 render the rectifier devices 52 and 53 non-conductive, whereupon the conductor 54 becomes positive with respect to ground by conduction through the rectifier device 57 and the voltage divider action of the resistors 55 and 59. This maintains the conductor 58 at its normal positive potential so that the inverter stages 60 and 64 remain quiescent. However, the positive pulse on the conductor 54 is translated through the rectifier device 68 and amplifier 69 to the delay unit 70 where it is stored for a digital period. Consequently, the unit 70 develops no output pulse at this time and the inverter stages 72 and 74 also remain quiescent. There is accordingly no pulse developed in the output circuit conductor 78.

If no pulses are applied to the input circuits *a* and *b* during the following digital period after a pulse has been stored in the delay unit 70, the latter develops an output pulse of negative-going polarity and this pulse is translated through the inverter stages 72 and 74 as a negative-going pulse at the output circuit 78. The operation in this respect is similar to that previously described in connection with the translation of a pulse by the inverter stages 60 and 64. If, on the other hand, a negative-going pulse is applied to either of the input circuits *a* or *b* at the next digital period, this pulse is translated through the inverter stages 60 and 64 at the same time that the output pulse of the delay unit 70 is translated through the inverter stages 72 and 74. It can be shown that these two translated pulses so control the state of conductivity of the several rectifier devices 61, 65, 73 and 75–77 that the potential of the output circuit conductor 78 does not change but the conductor 62 is raised to a positive potential with respect to ground. A positive pulse is accordingly translated through the rectifier device 80 and the amplifier 69 to the delay unit 70 which will operate to apply a delayed pulse to the phase inverters 72 and 74 one digit period later. Lastly it can be shown that when a negative-going pulse is applied to the input circuits *a* and *b* at the same time that a delayed pulse is applied by the delay unit 70 to the inverter 72, a negative-going pulse is developed at the output circuit conductor 78 while at the same time a positive-going pulse is developed on the conductor 62 and is applied through the rectifier device 80 and amplifier 69 to the delay unit 70. Thus the adder unit performs a binary addition of all binary numbers applied to its input circuits *a* and *b* and develops a totalized binary number in serial form at its output circuit conductor 78.

It will be apparent from the foregoing description of the invention that a binary multiplier embodying the invention has the advantage that a minimum of time is required for processing two binary numbers presented simultaneously in serial form, particularly in that the multiplier places no limitation on the minimum digital period and the binary product is immediately available simultaneously with the presentation of the two numbers. The multiplier has the further advantage that all delays experienced in its adder are uniform for all column-shifted binary numbers which it adds in arriving at the ultimate product so that such delays do not affect the accuracy of the multiplication operation. The binary product of the multiplier emerges instantaneously in serial form with the lowest order of the product emerging at the same bit time as the presentation of the lowest order of the multiplicand and multiplier and higher orders emerging concurrently with corresponding higher order bit times of the multiplicand and multiplier.

What is claimed is:

1. An electrical binary multiplier comprising, a binary adder including a plurality of adder units each adapted to add a pair of input binary numbers in serial form to develop an output binary number in serial form equal to the sum of the pair of input numbers, said adder units being arranged in parallel-cascade as a converging series to provide plural input channels corresponding in number to a predetermined maximum number of digits of a multiplier and providing an output circuit in which a resultant output sum binary digit is developed concurrently with the application of binary digits at any of said plural input channels and constituting one digit of a binary number in serial form equal to the sum of all binary numbers applied to said plural input channels, each of said channels having a controllable translation characteristic, means for applying a multiplicand binary number in serial form successively to each of said channels considered in a predetermined order but with a digit-period delay as between successive channels in said order, and means responsive to each of successive digits in a multiplier binary number in serial form for controlling in said predetermined order the translation characteristic of individual ones of said channels to effect controlled successive translation of said multiplicand binary number to said added.

2. An electrical binary multiplier comprising, a binary adder including a plurality of adder units each adapted to add a pair of input binary numbers in serial form to develop an output binary number in serial form equal to the sum of the pair of input numbers, said adder units being arranged in parallel-cascade as a converging series to provide plural input channels corresponding in number to a predetermined maximum number of digits of a multiplier and providing an output circuit in which a resultant output sum binary digit is developed concurrently with the application of binary digits at any of said plural input channels and constituting one digit of a binary number in serial form equal to the sum of all binary numbers applied to said plural input channels, each of said channels being responsive to an electrical control effect for effecting controlled translation of a binary number applied thereto, means for applying a multiplicand binary number in serial form successively to each of said channels considered in a predetermined order but with a digit-period delay as between successive channels in said order, and means responsive to each of successive digits in a multiplier binary number in serial form for developing and applying individually to said channels in said predetermined order a plurality of electrical control effects to effect controlled successive translation of said multiplicand binary number to said adder.

3. An electrical binary multiplier comprising, a binary added including a plurality of adder units each adapted to add a pair of input binary numbers in serial form to develop an output binary number in serial form equal to the sum of the pair of input numbers, said adder units being arranged in parallel-cascade as a convering series to provide plural input channels corresponding in number to a predetermined maximum number of digits of a multiplier and providing an output circuit in which a resultant output sum binary digit is developed concurrently with the application of binary digits at any of said plural input channels and constituting one digit of a binary number in serial form equal to the sum of all binary numbers applied to said plural input channels, each of said channels having a controllable translation characteristic, means for applying a multiplicand binary number in serial form successively to each of said channels considered in a predetermined order but with a digit-period delay as between successive channels in said order, a source of start-multiplication pulse signals, and means responsive to the signal of said source and to each of successive digits in a multiplier binary number in serial form for controlling in said predetermined order the translation characteristic of individual ones of said channels to effect controlled successive translation of said multiplicand binary number to said adder.

4. An electrical binary multiplier comprising, a binary adder including a plurality of adder units each adapted to add a pair of input binary numbers in serial form to develop an output binary number in serial form equal to the sum of the pair of input numbers, said adder units being arranged in parallel-cascade as a converging series to provide plural input channels corresponding in number to a predetermined maximum number of digits of a multiplier and providing an output circuit in which a resultant output sum binary digit is developed concurrently with the application of binary digits at any of said plural input channels and constituting one digit of a binary number in serial form equal to the sum of all binary numbers applied to said plural input channels, each of said channels including a coincidence gate, means for applying a multiplicand binary number in serial form successively to each gate of said channels considered in a predetermined order but with a digit-period delay as between successive channels in said order, and means responsive to each of successive digits in a multiplier binary number in serial form for controlling in said predetermined order the translation characteristic of individual ones of said gates to effect controlled successive translation of said multiplicand binary number to said adder.

5. An electrical binary multiplier comprising, a binary adder including a plurality of adder units each adapted to add a pair of input binary numbers in serial form to develop an output binary number in serial form equal to the sum of the pair of input numbers, said adder units being arranged in parallel-cascade as a converging series to provide plural input channels corresponding in number to a predetermined maximum number of digits of a multiplier and providing an output circuit in which a resultant output sum binary digit is developed concurrently with the application of binary digits at any of said plural input channels and constituting one digit of a binary number in serial form equal to the sum of all binary numbers applied to said plural input channels, each of said channels having a controllable translation characteristic, means including a plurality of tandem arranged digit-period delay units coupling said channels successively in a predetermined order for applying a multiplicand binary number in serial form successively to each of said channels in said order with a digit-period delay as between successive channels, and means responsive to each of successive digits in a multiplier binary number in serial form for controlling in said predetermined order the translation characteristic of individual ones of said channels to effect controlled successive translation of said multiplicand binary number to said adder.

6. An electrical binary multiplier comprising, a binary adder including a plurality of adder units each adapted to add a pair of input binary numbers in serial form to develop an output binary number in serial form equal to the sum of the pair of input numbers, said adder units being arranged in parallel-cascade as a converging series to provide plural input channels corresponding in number to a predetermined maximum number of digits of a multiplier and providing an output circuit in which a resultant output sum binary digit is developed concurrently with the application of binary digits at any of said plural input channels and constituting one digit of a binary number in serial form equal to the sum of all binary numbers applied to said plural input channels, each of said channels having a controllable translation characteristic, means for applying a multiplicand binary number in serial form successively to each of said channels considered in a predetermined order but with a digit-period delay as between successive channels in said order, a source of start-multiplication pulse signals, means including a plurality of coincidence gates coupled to said source through digit-period delay units and responsive to each of successive digits in a multiplier binary number in serial form for developing and individually applying to said channels in said predetermined order a plurality of control effects to effect controlled successive translation of said multiplicand binary number to said adder.

7. An electrical binary multiplier comprising, a binary adder including a plurality of adder units each adapted to add a pair of input binary numbers in serial form to develop an output binary number in serial form equal to the sum of the pair of input numbers, said adder units being arranged in parallel-cascade as a converging series to provide plural input channels corresponding in number to a predetermined maximum number of digits of a multiplier and providing an output circuit in which a resultant output sum binary digit is developed concurrently with the application of binary digits at any of said plural input channels and constituting one digit of a binary number in serial form equal to the sum of all binary numbers applied to said plural input channels, each of said channels having a controllable translation characteristic, means for applying a multiplicand binary number in serial form successively to each of said channels considered in a predetermined order but with a digit-period delay as between successive channels in said order, means for developing a series of digit-period start multiplication pulses, and means responsive to said last mentioned pulses and to each of successive digits in a multiplier binary number in serial form for developing and individually applying in said predetermined order to said channels a plurality of control effects to effect controlled successive translation of said multiplicand binary number to said adder.

8. An electrical binary multiplier comprising, a binary adder including a plurality of adder units each adapted to add a pair of input binary numbers in serial form to develop an output binary number in serial form equal to the sum of the pair of input numbers, said adder units being arranged in parallel-cascade as a converging series to provide plural input channels corresponding in number to a predetermined maximum number of digits of a multiplier and providing an output circuit in which a resultant output sum binary digit is developed concurrently with the application of binary digits at any of said plural input channels and constituting one digit of a binary number in serial form equal to the sum of all binary numbers applied to said plural input channels, each of said channels having a controllable translation characteristic, means for applying a multiplicand binary number in serial form successively to each of said channels considered in a predetermined order but with a digit-period delay as between successive channels in said order, means for developing a series of digit-period start-multiplication pulses, a plurality of coincidence gates arranged in a predetermined order and having input circuits to all of which a multiplier binary number is concurrently applied and having control circuits to which said series of start-multiplication pulses are individually applied in said order for effecting translation by each gate of an individual unit digit of said multiplier binary number, and means responsive to the translated unit digits of said gates for controlling in said predetermined order the translation characteristic of individual ones of said channels to effect controlled successive translation of said multiplicand binary number to adder.

9. An electrical binary multiplier comprising, a binary adder including a plurality of adder units each adapted to add a pair of input binary numbers in serial form to develop an output binary number in serial form equal to the sum of the pair of input numbers, said adder units being arranged in parallel-cascade as a converging series to provide plural input channels corresponding in number to a predetermined maximum number of digits of a multiplier and providing an output circuit in which a resultant output sum binary digit is developed concurrently with the application of binary digits at any of said plural input channels and constituting one digit of a binary number in serial form equal to the sum of all binary numbers applied to said plural input channels, each of said channels including a coincidence gate, means for applying a multiplicand binary number in serial form successively to the gate of each of said input channels considered in a predetermined order but with a digit-period delay as between successive channels in said order, and means responsive to each of successive digits in a multiplier binary number in serial form for developing and applying individually to said gates in said predetermined order a plurality of control potential pulses to effect controlled successive translation of said multiplicand binary number to said adder.

10. An electrical binary multiplier comprising, a binary adder including a plurality of adder units each adapted to add a pair of input binary numbers in serial form to develop an output binary number in serial form equal to the sum of the pair of input numbers, said adder units being arranged in parallel-cascade as a converging series to provide plural input channels corresponding in number to a predetermined maximum number of digits of a multiplier and providing an output circuit in which a resultant output sum binary digit is developed concurrently with the application of binary digits at any of said plural input channels and constituting one digit of a binary number in serial form equal to the sum of all binary numbers applied to said plural input channels, each of said channels including a coincidence gate, means including a plurality of tandem arranged digit-period delay units coupling said channels successively in a predetermined order for applying a multiplicand binary number in serial form successively to each of said channels in said order but with a digit-period delay as between successive channels, and means responsive to each of successive digits in a multiplier binary number in serial form for developing and applying individually to said gates in said predetermined order a plurality of control potential pulses to effect controlled successive translation of said multiplicand binary number to said adder.

11. An electrical binary multiplier comprising, a binary adder including a plurality of adder units each adapted to add a pair of input binary numbers in serial form to develop an output binary number in serial form equal to the sum of the pair of input numbers, said adder units being arranged in parallel-cascade as a converging series to provide plural input channels corresponding in number to a predetermined maximum number of digits of a multiplier and providing an output circuit in which a resultant output sum binary digit is developed concurrently with the application of binary digits at any of said plural input channels and constituting one digit of a binary number in serial form equal to the sum of all binary numbers applied to said plural input channels, each of said channels including a coincidence gate, means including a plurality of tandem arranged digit-period delay units coupling said channels successively in a predetermined order for applying a multiplicand binary number in serial form successively to each of said channels in said order but with a digit-period delay as between successive channels, a source of start-multiplication pulse signals, means responsive to the signal of said source and to each of successive digits in a multiplier binary number in serial form for developing and individually applying to said gates in said predetermined order a plurality of control potential pulses each having a leading edge coincident with an individual digit in said multiplier binary number and terminating with the leading edge of a succeeding start-multiplication pulse, thereby to effect controlled successive translation of said multiplicand binary number to said adder.

12. An electrical binary multiplier comprising, a binary adder including a plurality of adder units each adapted to add a pair of input binary numbers in serial form to develop an output binary number in serial form equal to the sum of the pair of input numbers, said adder units being arranged in parrallel-cascade as a converging series to provide plural input channels corresponding in number to a predetermined maximum number of digits of a multiplier and providing an output circuit in which a resultant output sum binary digit is developed concurrently with the application of binary digits at any of said plural input channels and constituting one digit of a binary number in serial form equal to the sum of all binary numbers applied to said plural input channels, each of said channels having a controllable translation characteristic and all thereof having substantially equal translation delay to said output channel, means for applying a multiplicand binary number in serial form successively to each of said channels considered in a predetermined order but with a digit-period delay as between successive channels in said order, and means responsive to each of successive digits in a multiplier binary number in serial form for controlling in said predetermined order the translation characteristic of individual ones of said channels to effect controlled successive translation of said multiplicand binary number to said adder.

References Cited in the file of this patent

UNITED STATES PATENTS

| | | |
|---|---|---|
| 2,672,283 | Havens | Mar. 16, 1954 |
| 2,685,407 | Robinson | Aug. 3, 1954 |
| 2,700,504 | Thomas | Jan. 25, 1955 |
| 2,711,526 | Gloess | June 21, 1955 |
| 2,785,854 | Chaimowicz | Mar. 19, 1957 |
| 2,790,599 | Gloess | Apr. 30, 1957 |
| 2,856,126 | Kilburn | Oct. 14, 1958 |

FOREIGN PATENTS

| | | |
|---|---|---|
| 1,086,043 | France | Aug. 4, 1954 |

OTHER REFERENCES

Harvard Computation Lab., Synthesis of Electronic Computing and Control Circuits, Harvard Univ. Press, Cambridge, Mass., copyright 1951, pages 199 to 202.

Gordon et al.: Special-Purpose Digital Data-Processing Computers, Proceedings of the Asso. of Computing Machinery, May 2 and 3, 1952, pages 40 to 42.

Meyer et al.: An Operational-Digital Feedback Divider, Transactions of the I.R.E. Prof. Group on Elec. Computers, EC3#1, March 1954, pages 17 and 18.